April 7, 1942.   E. T. PUTNAM   2,279,178
MOLD FOR MAKING CURVED COMPOSITE BUILDING BLOCKS
Filed June 5, 1941   4 Sheets-Sheet 1

Inventor
ERLE T. PUTNAM.
By Frank Fraser
Attorney

April 7, 1942.  E. T. PUTNAM  2,279,178

MOLD FOR MAKING CURVED COMPOSITE BUILDING BLOCKS

Filed June 5, 1941  4 Sheets-Sheet 2

Inventor
ERLE T. PUTNAM.

By
Frank Fraser
Attorney

April 7, 1942.   E. T. PUTNAM   2,279,178
MOLD FOR MAKING CURVED COMPOSITE BUILDING BLOCKS
Filed June 5, 1941   4 Sheets-Sheet 3
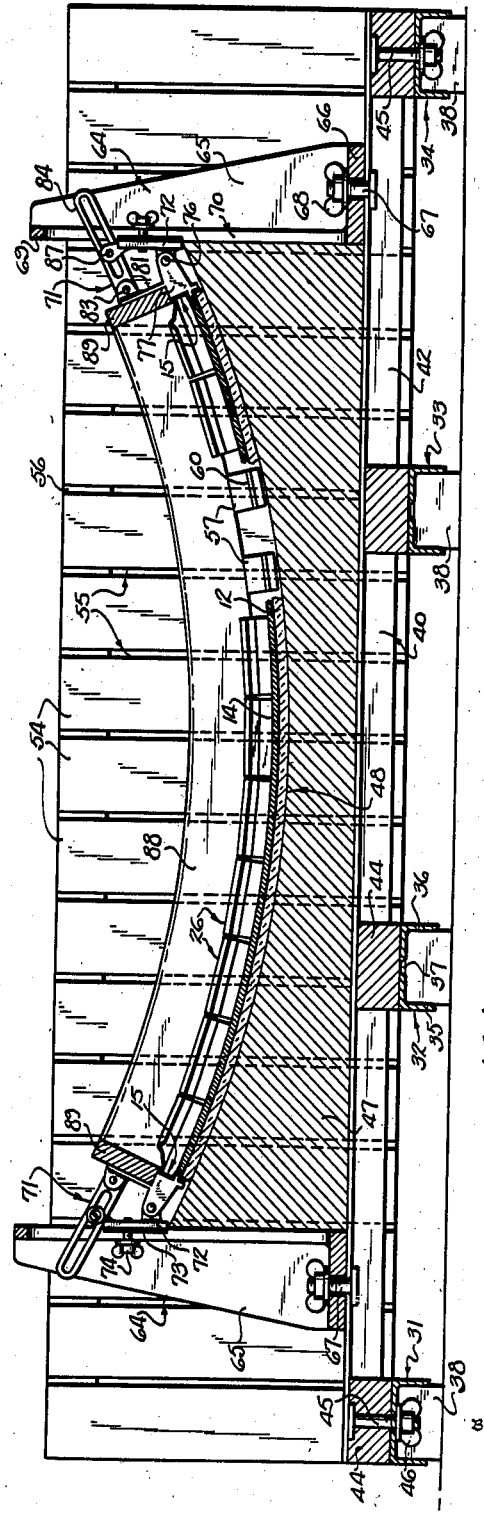
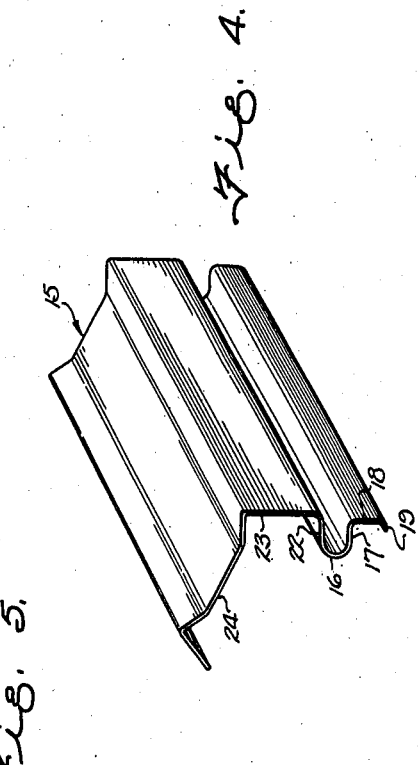
Inventor
ERLE T. PUTNAM.
Frank Fraser
Attorney April 7, 1942.  E. T. PUTNAM  2,279,178
MOLD FOR MAKING CURVED COMPOSITE BUILDING BLOCKS
Filed June 5, 1941  4 Sheets-Sheet 4

Inventor
ERLE T. PUTNAM.
By Frank Fraser
Attorney

Patented Apr. 7, 1942

2,279,178

UNITED STATES PATENT OFFICE 2,279,178

MOLD FOR MAKING CURVED COMPOSITE BUILDING BLOCKS

Erle T. Putnam, Detroit, Mich., assignor to Libbey-Owens-Ford Glass Company, Toledo, Ohio, a corporation of Ohio Application June 5, 1941, Serial No. 396,744

17 Claims. (Cl. 25—121)

The present invention relates to building blocks and to apparatus for use in the manufacture thereof.

An important object of this invention is to provide a bent or curved composite block of the type disclosed in Patent No. 2,235,115, issued March 18, 1941, and which is primarily adapted for use in the construction of the exterior walls of buildings.

This type of block consists briefly of a body portion, preferably formed from a cementitious material, and an ornamental facing therefor consisting preferably of a sheet or plate of opaque structural glass. The glass face plate is secured to the cementitious body portion by an interposed layer of adhesive material such as an asphaltic mastic cement and also by metal holders arranged at the edges of the block and engaging both the face plate and body portion.

Another important object of the invention is the provision of improved apparatus for use in the manufacture of bent or curved composite blocks of the above character and which is adaptable for the fabrication of blocks of different sizes and/or curvatures.

A further important object of the invention is the provision of apparatus of relatively simple, inexpensive construction by means of which composite blocks of the above character having a predetermined bend or curvature may be easily and quickly produced, and which apparatus embodies novel means for clamping the metal holders in properly assembled relation with respect to the glass face plate during the application of the layer of adhesive material to the back of said face plate and the pouring of the cementitious body portion.

Other objects and advantages of the invention will become more apparent during the course of the following description when taken in connection with the accompanying drawings.

In the drawings wherein like numerals are employed to designate like parts throughout the same:

Fig. 4 is a perspective view of one of the metal holders;

Fig. 5 is a vertical longitudinal section through the apparatus employed in the manufacture of the blocks;

Figure 1:
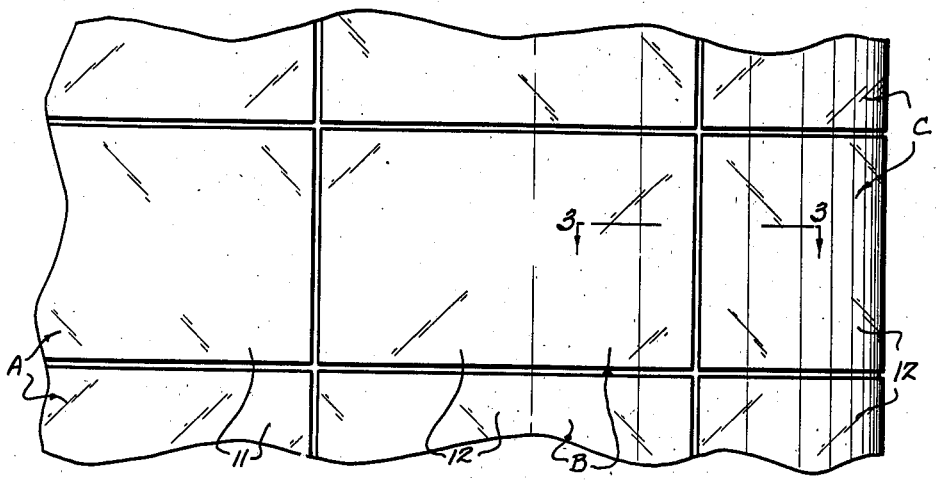
Fig. 1 is a front elevation of a portion of a wall including building blocks constructed in accordance with the present invention.

With reference now to the drawings and particularly to Fig. 1, there is shown a portion of the exterior wall of a building including the three tiers of blocks A, B and C. The blocks forming the tier A are of the type disclosed in Patent No. 2,235,115 referred to above and are provided with flat ornamental glass face plates 11. The blocks forming the tiers B and C are of the same general type as the blocks of tier A, the principal difference being that the glass face plates 12 thereof are curved or bent in a horizontal plane in accordance with the present invention as shown in Fig. 3.

Each of the blocks forming tiers B and C comprises a molded body portion 13 formed from a suitable plastic material such as concrete, Haydite or the like to the front surface of which the ornamental glass face plate 12 is secured by means of a relatively thick layer of suitable adhesive material 14, preferably an asphaltic mastic cement. The layer of adhesive material 14 covers substantially the entire front surface of the body portion 13 and serves not only to bind the glass face plate 12 to the body portion but also permits relative expansion and contraction between the two without danger of said face plate becoming broken or accidentally displaced. The layer of adhesive material 14 also serves to cushion the glass face plate against shock and blows thereby increasing its resistance to breakage.

Figure 3:
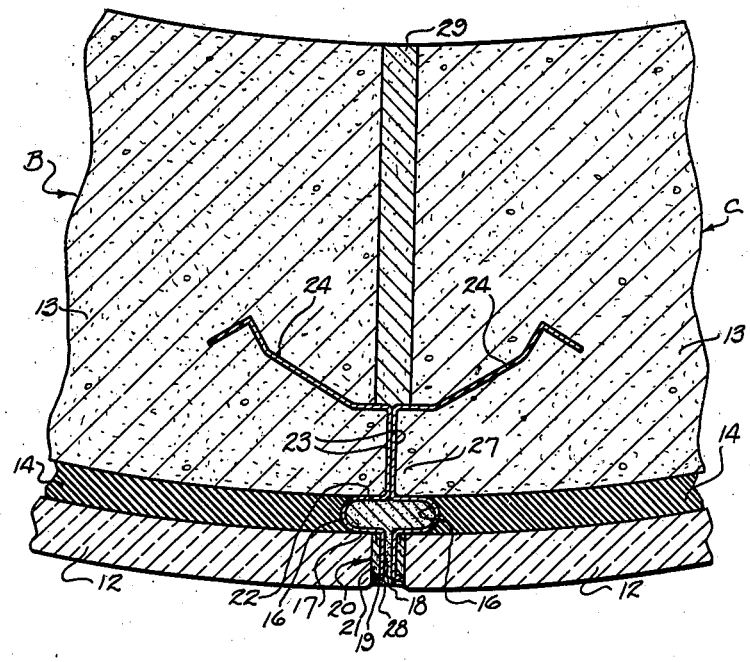
Fig. 3 is a horizontal section through two adjacent blocks taken substantially on line 3—3 of Fig. 1.

Arranged at each end of the block is a metal holder 15 of the construction shown in Fig. 4 and comprising a longitudinally extending channel-shaped portion 16 which, as clearly shown in Fig. 3, is received between the glass face plate 12 and molded body portion 13 of the block. The outer wall 17 of the channeled portion 16 constitutes a shoulder which abuts the rear surface of the face plate 12 and extending forwardly therefrom at substantially right angles thereto is a flange 18 disposed opposite the respective end edge of said face plate and terminating in an inwardly directed lip 19.

The opposite end edges 20 of the glass face plate 12 are square with the opposite surfaces of said face plate and engaging each of said edges is a cushioning strip 21 of some suitable resilient material, preferably an asphalt impregnated cork strip although it may be of rubber, rubber composition, etc. These strips 21 serve to protect the edges of the glass face plate and act as a cushion to prevent chipping or spalling of said face plate during the setting of the block in place in a wall. As shown in Fig. 3, the cushioning strip 21 terminates inwardly of the outer surface of the face plate, while the shoulder 17, flange 18 and lip 19 of the respective metal holder 15 define a substantially U-shaped channel in which said strip is received. The cushioning strip 21 is preferably secured to the edge of the face plate by a suitable adhesive and is relatively thicker than the width of the lip 19 of the metal holder so that while said lip extends over or overlaps the forward edge of said strip it does not contact the edge of the face plate.

The inner wall 22 of the channeled portion 16 of metal holder 15 constitutes a shoulder which engages the outer surface of the body portion 13; said shoulder 22 projecting slightly beyond the outer shoulder 17 and extending at right angles with respect thereto is a relatively wide, flat load bearing surface 23 which is disposed opposite the body portion of the block. Formed integral with and constituting a continuation of the load bearing surface 23 is an inwardly directed flange 24 having a plurality of angular portions which are embedded and effectively tie into the body portion 13.

Figure 2:
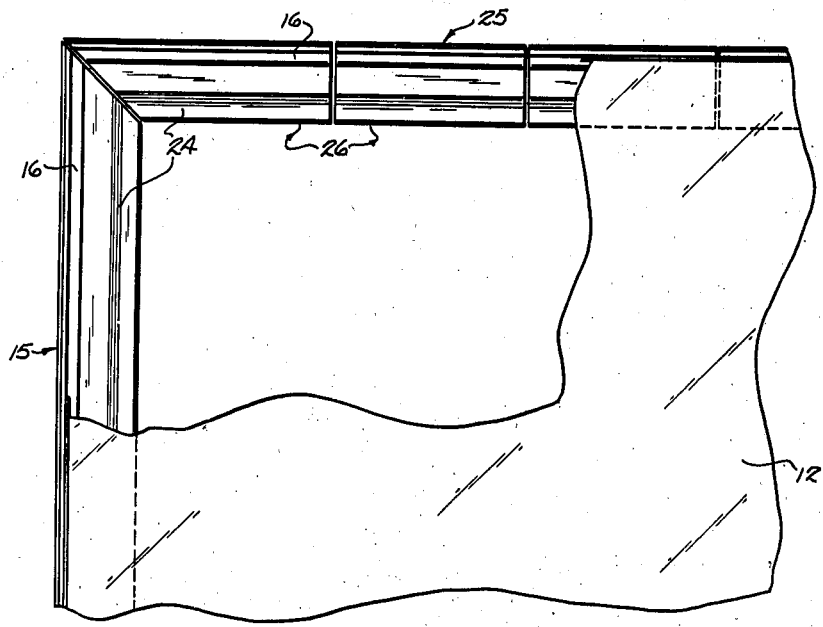
Fig. 2 is a front view of one of the glass face plates and metal holders associated therewith, said face plate being partially broken away to more clearly show the metal holders.

Arranged along each curved side edge of the glass face plate 12 is a metal holder 25 and these holders are the same in all respects as the metal holders 15 and associated with the face plate in the same manner, with the single exception that the holders 25 are formed of a plurality of relatively short sections 26 (Fig. 2) so that they may be arranged relative to one another to conform to the curvature of the glass face plate 12 as clearly shown in Fig. 5.

In the fabrication of the bent or curved composite blocks herein provided, the glass face plate 12 is first bent to the desired curvature and then laid horizontally on a suitable support with its front face down. The metal holders 15 are then associated with the opposite end edges of the face plate so that the outer shoulders 17 of the channeled portions 16 of said holders rest upon the rear surface of the face plate, while the lips 19 fit around the cushioning strips 21. The sectional metal holders 25 are similarly associated with the curved side edges of the face plate and clamping means are provided for securing the metal holders 15 and 25 in proper position. The adhesive material 14 is then applied in an even uniform layer to the back of the face plate to cover substantially the entire surface thereof and to form a layer of a thickness approximately equal to the depth of the channeled portions 16 of the metal holders. The cement or other plastic material forming the body portion 13 is then deposited on top of the layer of adhesive material to cover the same and to completely fill the space defined by the metal holders. A mold is also preferably arranged around the metal holders to permit the molded body portion 13 to be made considerably thicker than the width of said holders (Fig. 3) and when this is done it will be seen that the flanges 24 of the metal holders will be embedded in the body portion. After the body portion has set, the mold and clamping means for the metal holders are removed and the block is ready for use.

In constructing a wall such as shown in Fig. 1, the composite blocks are laid up in courses, one upon the other, and may or may not be mechanically anchored to a rear or foundation wall. Due to the fact that the load bearing surfaces 23 of the metal holders 15 and 25 project beyond the edges of the glass face plate, there will be formed around the edges of the body portion 13 a continuous ledge 27 which also projects slightly beyond the edges of the face plate. As a result, when the blocks are laid up in courses in a wall, the load bearing surfaces 23 of vertically adjacent blocks and also horizontally adjacent blocks (Fig. 3) will engage one another, while the edges of the adjacent face plates will be spaced slightly from one another, and in this space is inserted a suitable caulking or pointing material 28 which will ordinarily fill the mating channels 16 of adjacent metal holders.

With such a construction, the structural load of the wall will be supported entirely by the body portions 13 of the blocks with none of the load being placed upon the glass face plates 12. In other words, the load of one block is transferred directly to the next lower block and each block takes the full strain of the blocks above it. Since it is impossible for the vertically adjacent face plates to engage one another when the blocks are set in place in the above manner, the strain upon said face plates will be reduced to a minimum thereby eliminating the liability of breakage and chipping thereof. When the blocks are mounted in place, the body portions 13 of vertically adjacent blocks and also horizontally adjacent blocks (Fig. 3) will also be spaced from one another inwardly of the load bearing surfaces 23, and this space can be filled with a layer of mortar 29.

In Figs. 5 to 9 is disclosed a preferred form of apparatus adapted for use in the manufacture of the bent or curved composite blocks described hereinabove. This apparatus comprises a suitable horizontal base 30 upon which are carried a plurality of spaced parallel rails 31, 32, 33 and 34, each comprising a pair of angle irons 35 and 36 spaced from one another to provide a longitudinally extending slot 37 therebetween. The angle irons 35 and 36 are supported at their opposite ends and also at one or more points intermediate their ends if desired by blocks 38 secured to the base 30.

Supported upon and extending at right angles to the rails 31—34 are the spaced parallel stringers 39 and 40, each also consisting of a pair of angle irons 41 and 42 spaced from one another to provide a slot 43 therebetween. Each pair of angle irons 41 and 42 is secured at its opposite ends and also intermediate its ends to blocks 44 which rest upon the rails 31—34 and are secured thereto by bolts 45 passing downwardly through the slot 37 in the respective rail and having threaded upon its lower end a wing nut 46. In this way, the stringers 39 and 40 can be adjusted relative to one another along the rails 31—34.

Carried upon the stringers 39 and 40 is a supporting bed 47 upon which the glass face plate 12 is horizontally supported during the fabrication of the block. The bed 47 may be formed of any suitable material, such as wood, plaster of Paris or the like, etc., and the upper surface 48 thereof is curved to correspond to the curvature of the glass face plate 12 so that when the said face plate is placed upon the said bed it accurately fits the same. By uniformly supporting the glass face plate throughout its entire area, the liability of breakage thereof during the application of the layer of adhesive material 14 and the pouring of the plastic body portion 13 is minimized.

Also carried upon and extending at right angles to the rails 31—34 outwardly of and parallel with the stringers 39 and 40 are the angle irons 49 and 50 respectively, the angle iron 50 being fixedly secured to said rails by rivets or the like 51, while the angle iron 49 is adjustably mounted upon the said rails for movement toward and away from angle iron 50. This is effected by means of bolts 52 which pass upwardly through the slots 37 in said rails and also through openings in the horizontal flange of angle iron 49 and have threaded upon their upper ends the wing nuts 53. Secured to the vertical flange of each angle iron 49 and 50 are a plurality of vertically disposed side boards 54 spaced from one another to provide vertical slots 55 therebetween and being tied together at their upper ends by a second angle iron 56.

Carried by the side boards 54 are a plurality of clamping blocks 57 secured in place by set screws 58 passing through the vertical slots 55 between said side boards and threaded within openings 59 in said blocks. More particularly, one of the clamping blocks 57 is provided for each section 26 of the respective metal holder 25 and serves to clamp the same firmly against the curved side edge of the glass face plate. To this end, each clamping block 57 is provided adjacent its lower end with an inwardly directed tongue 60 which is received within the channeled portion 16 of the respective section 26 of metal holder 25. The inner surface 61 of the clamping block above tongue 60 is flat and adapted to engage the load bearing surface 23 of the metal holder, while the inner surface portion 62 beneath tongue 60 is also flat and engages the lip 18 of said metal holder.

Figure 8:
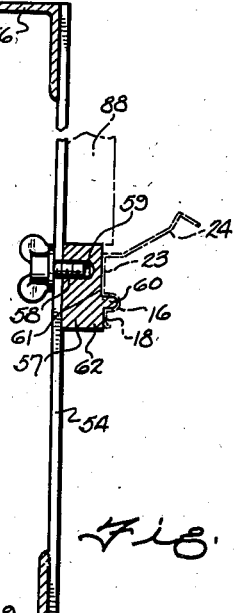
Fig. 8 is a vertical section taken substantially on line 8—8 of Fig. 6 showing one of the clamping blocks for securing the metal holders to the curved side edges of the glass face plate.

It will be noted in Fig. 8 that the upper portion 61 of the inner surface of clamping block 57 which engages the load bearing surface 23 of the metal holder is disposed slightly outwardly of the lower surface portion 62 which engages the flange 18 of said metal holder and this is because the load bearing surface 23 of the metal holder projects outwardly slightly beyond the flange 18 as explained above. In other words, the inner surface of the clamping block 57 is shaped to conform to the outer surface of the metal holder. With the construction shown, it will be readily seen that the clamping blocks 57 can be moved vertically relative to one another upon the side boards 54 and can also be rotated on the screws 58 to assume the desired angular position as shown in Fig. 5 to engage the several sections 26 of metal holders 25 and effectively maintain them in firm clamping engagement with the curved side edges of the glass face plate.

For the purpose of maintaining the metal holders 15 in engagement with the straight end edges 20 of the glass face plate 12, there is provided at each end of the supporting bed 47 a pair of clamping fixtures 63 and 64 carried by the stringers 39 and 40 respectively. Each of said clamping fixtures comprises a vertical supporting bracket 65 having a horizontal base 66 resting upon the respective stringer 39 or 40, and secured thereto by a bolt 67 passing upwardly through the slot 43 between angle irons 41 and 42 and having threaded upon its upper end a wing nut 68. Formed integral with the base 66 is a vertical wall 69 provided with a vertical slot 70 and carrying a clamping member designated in its entirety by the numeral 71.

Figure 9:
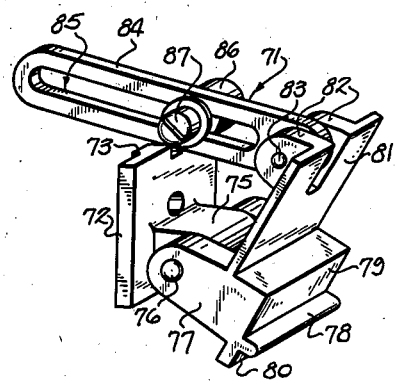
Fig. 9 is a perspective view of one of the clamping fixtures for securing the metal holders to the straight end edges of the glass face plate.
Figure 6:
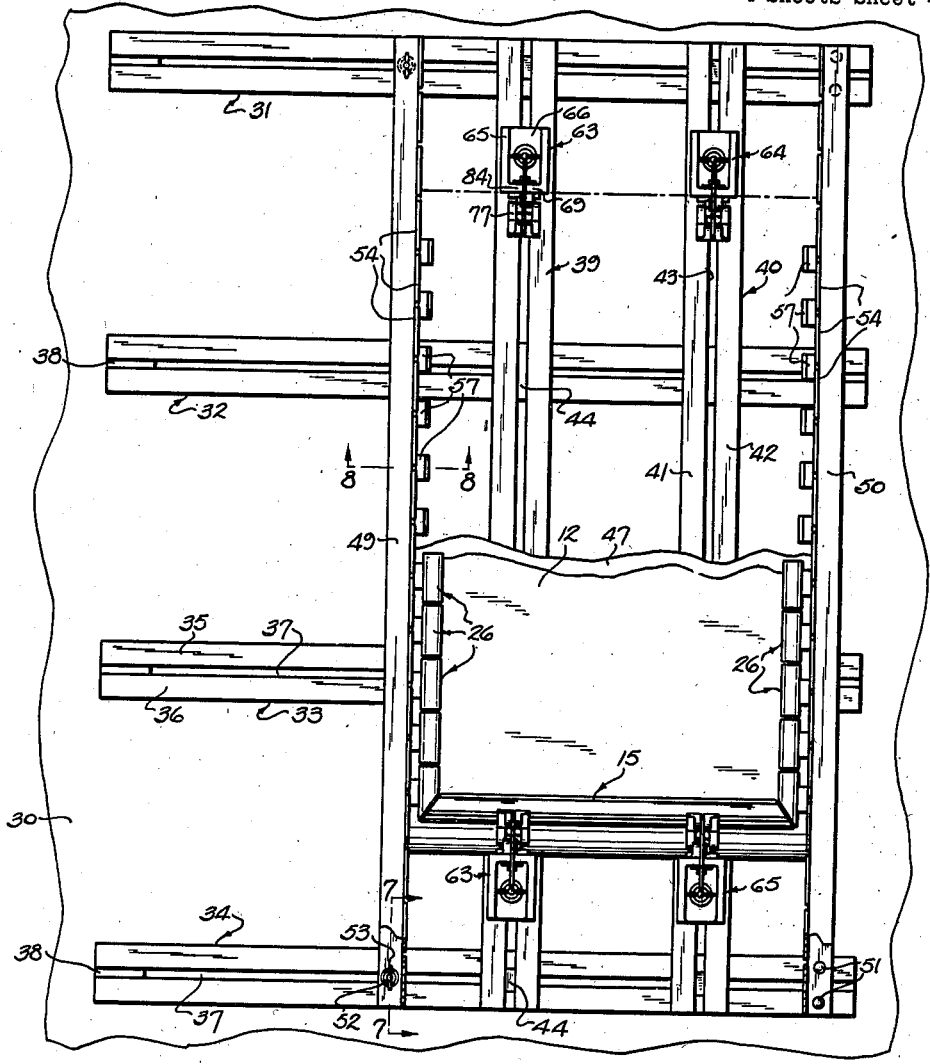
Fig. 6 is a plan view of the apparatus.
Figure 7:
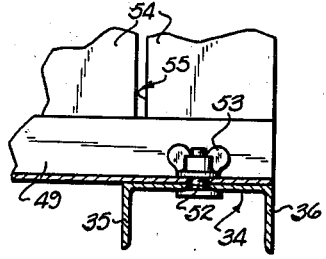
Fig. 7 is a detail section taken substantially on line 7—7 of Fig. 6.

With reference particularly to Figs. 5 and 9, the clamping member 71 includes a flat attaching plate 72 provided upon its rear surface with a vertical rib 73 which is received within the slot 70 in bracket 65 and is secured to said bracket by a screw or the like 74. The attaching plate 72 is provided at its lower end with a forwardly directed lug 75 to which is pivoted as at 76 the clamping block 77. This clamping block is formed in substantially the same manner as clamping blocks 57 in that it is also shaped to fit the metal holder. Thus, the clamping block 77 is provided adjacent its lower end with a tongue 78 adapted to be received within the channeled portion 16 of the respective metal holder 15, while the upper flat inner surface portion 79 of said block engages the load bearing surface 23 of the metal holder and the lower flat inner surface portion 80 thereof the flange 18 of said metal holder.

Formed integral with the clamping block 77 is an upstanding retaining plate 81 provided at its upper end with spaced ears 82 between which is pivoted as at 83 one end of a link 84 formed with a closed slot 85. Provided at the upper end of the attaching plate 72 is a lug 86 within which is horizontally threaded a set screw 87 passing through the slot 85 in link 84. With this arrangement, the clamping block 77 can be swung upon its pivot 76 into position to engage the metal holder 15 and secured in such position by tightening set screw 87. The clamping block can also be adjusted bodily vertically upon bracket 65 and the said bracket likewise adjustable along the respective stringer 39 or 40.

In forming the composite block, a glass face plate 12, bent to the desired curvature, is first placed horizontally upon the upper surface 48 of supporting bed 47. The several sections 26 of the metal holders 25 are then associated with the curved side edges of the face plate and secured in place by means of the clamping blocks 57 which, as brought out above, can be adjusted both vertically and angularly relative to one another to fit the curvature of the sectional holders. The metal holders 15 are then associated with the opposite end edges of the glass face plate and secured in place by the clamping blocks 77.

After the metal holders 15 and 25 have been firmly clamped to the edges of the glass face plate 12, a suitable mold is arranged above the face plate in surrounding relation thereto. This mold herein comprises a pair of wooden side boards 88 which are curved to conform to the curvature of the glass face plate and are supported at their lower edges upon the upper surfaces of the clamping blocks 57 (Figs. 5 and 8). End boards 89 are then placed upon the upper surfaces of the clamping blocks 77 inwardly of the retaining plates 81 (Fig. 5) and are preferably sufficiently long so that they engage the opposite end edges of side boards 88. The end boards 89 will be held firmly in place by the retaining plates 81. When the mold is properly positioned, the layer of adhesive material 14 is applied to the back surface of the glass face plate, after which the plastic material forming the body portion 13 is poured upon the layer of adhesive material. After the material forming the body portion has set, the block is completed and ready for use.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for use in the manufacture of curved composite building blocks of the type including a molded body portion, a curved ornamental face plate covering the front surface of said body portion and metal holders arranged at the edges of the face plate and engaging the body portion for securing said face plate to said body portion; comprising a supporting bed having a curved upper surface for supporting the curved ornamental face plate horizontally thereon, clamping means for securing the face plate in fixed position upon said supporting bed and for also clamping the metal holders in proper association therewith, and a mold arranged above the face plate in surrounding relation thereto for receiving the material forming the body portion.

2. In apparatus of the character defined in claim 1 in which the mold is supported by the clamping means in surrounding relation to the face plate for receiving the material forming the body portion.

3. In apparatus for use in the manufacture of curved composite building blocks of the type including a molded body portion, a curved ornamental face plate covering the front surface of said body portion and metal holders securing the face plate to the body portion and having portions engaging the edges of said face plate and other portions engaging said body portion; comprising a supporting bed for supporting the curved face plate horizontally thereon and having its upper surface shaped to correspond to the curvature of said face plate, clamping means for securing the face plate in fixed position upon said bed and for also clamping the metal holders in proper association therewith, said clamping means having portions shaped to correspond to and exert a clamping action on the above-mentioned portions of said metal holders, and a mold arranged above the face plate in surrounding relation thereto for receiving the material forming the body portion.

4. In apparatus of the character defined in claim 3 in which the mold is supported by the clamping means in surrounding relation to the face plate for receiving the material forming the body portion.

5. In apparatus for use in the manufacture of curved composite building blocks of the type including a molded body portion, a curved ornamental face plate covering the front surface of said body portion and metal holders arranged at the edges of the face plate and engaging the body portion for securing said face plate to said body portion; comprising a horizontal supporting base, a bed carried by said base and having a curved upper surface for supporting the curved ornamental face plate horizontally thereon, clamping members carried upon said base at opposite ends of said bed, additional clamping members carried upon said base at opposite sides of said bed, said first and second-mentioned clamping members cooperating to secure the face plate in fixed position upon said bed and for also clamping the metal holders in proper association therewith, and a mold arranged above the face plate in surrounding relation thereto for receiving the material forming the body portion.

6. In apparatus of the character defined in claim 5 in which the mold is removably supported upon the clamping members in surrounding relation to the face plate for receiving the material forming the body portion.

7. In apparatus for use in the manufacture of curved composite building blocks of the type including a molded body portion, a curved ornamental face plate covering the front surface of said body portion and metal holders securing the face plate to the body portion and having portions engaging the edges of said face plate and other portions engaging said body portion; comprising a horizontal supporting base, a bed carried by said base for supporting the curved ornamental face plate horizontally thereon and having its upper surface shaped to correspond to the curvature of said face plate, clamping members carried upon said base at opposite ends of said bed, additional clamping members carried upon said base at opposite sides of said bed, said first and second-mentioned clamping members having portions shaped to correspond to and exert a clamping action on the above-mentioned portions of said metal holders for securing said holders in proper association with said face plate, and a mold arranged above the face plate in surrounding relation thereto for receiving the material forming the body portion.

8. In apparatus of the character defined in claim 7 in which the mold is removably supported upon the clamping members in surrounding relation to the face plate for receiving the material forming the body portion.

9. In apparatus for use in the manufacture of curved composite building blocks of the type including a molded body portion, a curved ornamental face plate covering the front surface of said body portion and having curved side edges and straight end edges and metal holders arranged at the edges of the face plate and engaging the body portion for securing said face plate to said body portion; comprising a supporting bed for horizontally supporting the curved ornamental face plate thereon and having its upper surface curved to correspond to the curvature of said face plate, clamping members arranged at opposite end of said supporting bed for securing metal holders in proper association with the straight end edges of said face plate, additional clamping members arranged at opposite sides of said supporting bed for securing metal holders in proper association with the curved side edges of said face plate, means for mounting said second-mentioned clamping members for bodily vertical and angular adjustment to fit the contour of the respective metal holders, and a mold arranged above the face plate in surrounding relation thereto for receiving the material forming the body portion.

10. In apparatus of the character defined in claim 9 in which the mold is removably supported upon the first and second-mentioned clamping members in surrounding relation to the face plate for receiving the material forming the body portion.

11. In apparatus for use in the manufacture of curved composite building blocks of the type including a molded body portion, a curved ornamental face plate covering the front surface of said body portion and having curved side edges and straight end edges and metal holders arranged at the edges of the face plate and engaging the body portion for securing said face plate to said body portion; comprising a supporting bed for horizontally supporting the curved ornamental face plate thereon and having its upper surface curved to correspond to the curvature of said face plate, pivotally mounted clamping members arranged at opposite ends of said supporting bed for securing metal holders in proper association with the straight end edges of said face plate, additional clamping members arranged at opposite sides of said supporting bed for securing metal holders in proper association with the curved side edges of said face plate, and a mold arranged above the face plate in surrounding relation thereto for receiving the material forming the body portion.

12. In apparatus of the character defined in claim 11 in which the mold is removably supported upon the first and second-mentioned clamping members in surrounding relation to the face plate for receiving the material forming the body portion.

13. In apparatus for use in the manufacture of curved composite building blocks of the type including a molded body portion, a curved ornamental face plate covering the front surface of said body portion and having curved side edges and straight end edges and metal holders arranged at the edges of the face plate and engaging the body portion for securing said face plate to said body portion; comprising a supporting bed for horizontally supporting the curved ornamental face plate thereon and having its upper surface curved to correspond to the curvature of said face plate, pivotally mounted clamping members arranged at opposite ends of said supporting bed for securing metal holders in proper association with the straight end edges of said face plate, additional clamping members arranged at opposite sides of said supporting bed for securing metal holders in proper association with the curved side edges of said face plate, means for mounting said second-mentioned clamping members for bodily vertical and angular adjustment to fit the contour of the respective metal holders, and a mold arranged above the face plate in surrounding relation thereto for receiving the material forming the body portion.

14. In apparatus of the character defined in claim 13 in which the mold is removably supported upon the first and second-mentioned clamping members in surrounding relation to the face plate for receiving the material forming the body portion.

15. In apparatus for use in the manufacture of curved composite building blocks of the type including a molded body portion, a curved ornamental face plate covering the front surface of said body portion and having curved side edges and straight end edges and metal holders engaging the edges of said face plate and other portions engaging said body portions; comprising a supporting base, a bed carried by said base and having a curved upper surface for supporting the curved ornamental face plate horizontally thereon, clamping members carried by said supporting base at opposite ends of said bed for securing metal holders in proper association with the straight end edges of said face plate, additional clamping members carried by said suporting base at opposite sides of said bed for securing metal holders in proper association with the curved side edges of said face plate, means for mounting said second-mentioned clamping members for bodily vertical and angular adjustment to fit the contour of the respective metal holders, said first and second-mentioned clamping members having portions shaped to correspond to and exert a clamping action on the above-mentioned portions of said metal holders, and a mold supported upon said first and second-mentioned clamping members in surrounding relation to said face plate for receiving the material forming the body portion.

16. In apparatus for use in the manufacture of curved composite building blocks of the type including a molded body portion, a curved ornamental face plate covering the front surface of said body portion and having curved side edges and straight end edges and metal holders securing the face plate to the body portion and having portions engaging the edges of said face plate and other portions engaging said body portions; comprising a supporting base, a bed carried by said base and having a curved upper surface for supporting the curved ornamental face plate horizontally thereon, pivotally mounted clamping members carried by said supporting base at opposite ends of said bed for securing metal holders in proper association with the straight end edges of said face plate, additional clamping members carried by said supporting base at opposite sides of said bed for securing metal holders in proper association with the curved side edges of said face plate, said first and second-mentioned clamping members having portions shaped to correspond to and exert a clamping action on the above-mentioned portions of said metal holders, and a mold removably supported upon said first and second-mentioned clamping members in surrounding relation to said face plate for receiving the material forming the body portion.

17. In apparatus for use in the manufacture of curved composite building blocks of the type including a molded body portion, a curved ornamental face plate covering the front surface of said body portion and having curved side edges and straight end edges and metal holders securing the face plate to the body portion and having portions engaging the edges of said face plate and other portions engaging said body portions; comprising a horizontal supporting base, a bed carried by said base and having a curved upper surface for supporting the curved ornamental face plate horizontally thereon, pivotally mounted clamping members carried by said supporting base at opposite ends of said bed for securing metal holders in proper association with the straight end edges of said face plate, additional clamping members carried by said supporting base at opposite sides of said bed for securing metal holders in proper association with the curved side edges of said face plate, means for mounting said second-mentioned clamping members for bodily vertical and angular adjustment to fit the contour of the respective metal holders, said first and second-mentioned clamping members having portions shaped to correspond to and exert a clamping action on the above-mentioned portions of said metal holders, and a mold removably supported upon said first and second-mentioned clamping members in surrounding relation to said face plate for receiving the material forming the body portion.

ERLE T. PUTNAM.